(12) United States Patent
Shagam et al.

(10) Patent No.: US 9,491,261 B1
(45) Date of Patent: Nov. 8, 2016

(54) REMOTE MESSAGING PROTOCOL

(71) Applicant: Amazon Technologies, Inc., Reno, NV (US)

(72) Inventors: Joshua Abel Shagam, Seattle, WA (US); Vishal Parakh, Seattle, WA (US); Diwakar Chakravarthy, Kirkland, WA (US); Antoun Joubran Kanawati, Seattle, WA (US); Mukul Vijay Karnik, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 13/953,081

(22) Filed: Jul. 29, 2013

(51) Int. Cl.
*H04L 29/06* (2006.01)

(52) U.S. Cl.
CPC .................................. *H04L 67/40* (2013.01)

(58) Field of Classification Search
CPC .............. H04L 29/08072; H04L 29/08081; H04L 29/06; H04L 29/06013; H04L 29/06074; H04L 29/06095
USPC ........................................................ 709/201
See application file for complete search history.

(56) References Cited

U.S. PATENT DOCUMENTS

| | | | | |
|---|---|---|---|---|
| 6,119,167 A * | 9/2000 | Boyle et al. | ........... | 709/234 |
| 6,147,986 A * | 11/2000 | Orsic | ........... | 370/349 |
| 6,597,708 B1 * | 7/2003 | Mauger | ........... | H04Q 11/0478 370/395.6 |
| 6,651,117 B1 * | 11/2003 | Wilson | ........... | H04L 12/413 370/351 |
| 6,704,794 B1 * | 3/2004 | Kejriwal | ........... | H04L 29/06 370/392 |
| 7,216,164 B1 * | 5/2007 | Whitmore et al. | ........... | 709/224 |
| 2002/0042875 A1 * | 4/2002 | Shukla | ........... | 713/151 |
| 2003/0123481 A1 * | 7/2003 | Neale et al. | ........... | 370/466 |
| 2006/0010245 A1 * | 1/2006 | Carnahan | ........... | H04L 29/06027 709/231 |
| 2008/0256170 A1 * | 10/2008 | Hayashi et al. | ........... | 709/201 |
| 2008/0268947 A1 * | 10/2008 | Fyock et al. | ........... | 463/29 |
| 2009/0135851 A1 * | 5/2009 | Veillette | ........... | 370/469 |
| 2009/0157866 A1 * | 6/2009 | Sridharan et al. | ........... | 709/224 |
| 2011/0299554 A1 * | 12/2011 | Ros-Giralt et al. | ........... | 370/469 |
| 2012/0265984 A1 * | 10/2012 | Ramanujan | ........... | 713/156 |
| 2014/0351447 A1 * | 11/2014 | Annamalaisami | .. | H04L 65/1069 709/227 |

OTHER PUBLICATIONS

Eddy, RFC 4987, Aug. 2007, 19 pages.*
Davies, Windows Server 2008 TCP/IP Protocols and Services, Jan. 9, 2008, Excerpts, 10 pages.*
Branden, R., RFC 1644, Jul. 1994, IETF, 38 pages.*
Allman, M., et al. Networking Group's Requests for Comments, RFC 2581, TCP Congestion Control, Apr. 1999.
Allman, M., et al. Networking Group's Requests for Comments, RFC 5681, TCP Congestion Control, Sep. 2009.
Cert, Vinton, et al., Networking Group's Requests for Comments, RFC 675, Specification of Internet Transmission Control Program, Dec. 1974.

(Continued)

*Primary Examiner* — Brendan Higa
*Assistant Examiner* — Leon Y Tseng
(74) *Attorney, Agent, or Firm* — Knobbe, Martens, Olson & Bear, LLP (57) ABSTRACT

Processes and systems are disclosed for a remote messaging protocol that combines application data and reliability information into a three-packet handshake exchange. Each packet may comprise message information indicating an initial packet, or an acknowledgement packet, along with a unique identifier for identifying responses to the initial message. Time-to-live and retransmission timers may be used in order to increase reliability of the protocol.

24 Claims, 5 Drawing Sheets

(56) References Cited

OTHER PUBLICATIONS

Cheng, Y., et al. TCP Fast Open, Feb. 16, 2012.
Cheng, Y., et al. TCP Fast Open, Jul. 16, 2012.
Cheng, Y., et al. TCP Fast Open, Oct. 22, 2012.
Cheng, Y., et al. TCP Fast Open, Feb. 25, 2013.
Cheng, Y., et al. TCP Fast Open, Jul. 15, 2013.
Cheng, Y., et al. TCP Fast Open, Oct. 14, 2013.
Cheng, Y., et al. TCP Fast Open, Jan. 26, 2014.
Cheng, Y., et al. TCP Fast Open, Feb. 14, 2014.
Cheng, Y., et al. TCP Fast Open, Mar. 11, 2014.
Networking Group's Requests for Comments, RFC 793, Transmission Control Protocol, Sep. 1981.
Networking Group's Requests for Comments, RFC 1122, Requirements for Internet Hosts—Communication Layers, Oct. 1989.
Postel, J., RFC 768, User Datagram Protocol, Aug. 28, 1980.
Radhakrishnan, Sivasankar, et al., TCP Fast Open, ACM CoNEXT, Dec. 6-9, 2011.
RDS Wire Specification 3.1 Document Version 1.0.0, Nov. 8, 2010.
U.S. Appl. 13/927,892, Not Yet Published, filed Jun. 26, 2013, Amazon Technologies, Inc.

* cited by examiner

FIG. 1

FIG. 4A ial implementations described in this Specification—that are allocated resources and process in order to use TCP and other reliable protocols. These advantages allow for communication without the overhead of TCP through a process described herein. Although the systems and processes herein are described with respect to particular implementations in the Specification, a skilled artisan will appreciate that these features may be implemented with variations or through use of subroutines/subprocesses. To take one example, although the Specification describes use of a single UDP socket to send packets, it will be clear that any one or more UDP sockets may be used instead of the single UDP socket. Similarly, although systems and processes are described herein as operating on a stateless protocol like UDP, they can also be implemented using other stateless or stateful protocols.

REMOTE MESSAGING PROTOCOL

BACKGROUND

Offering computing services often requires coordination and communication between processes operating on multiple computing systems. For example, load balancers may require communication between processes executing on separate network systems (e.g. two web servers, or a client and a web server, etc.).

To assist in communication, some enterprises use IP networking protocols to transfer information between resident applications running on these computing systems. For example, one process on one computing system may open a TCP socket with another process executing on a second computing system to transport information between processes. This functionality allows communication to flow freely over the network between two processes associated with the TCP connection.

BRIEF DESCRIPTION OF THE DRAWINGS

Throughout the drawings, reference numbers are re-used to indicate correspondence between referenced elements. The drawings are provided to illustrate embodiments of the inventions described herein and not to limit the scope thereof.

DETAILED DESCRIPTION

Introduction

Although Transmission Control Protocol (TCP) and other reliable data protocols can be used for interprocess communication between computing systems, using TCP or other standard reliable protocols may suffer from a number of drawbacks. For long flows of interprocess communication where two computing systems are frequently communicating with each other, TCP may be ideal and justify the resources and time setting up a TCP socket. However, many networking contexts do not require frequent communication. For example, computing systems that make quick allocations for computing resources, such as with a software-based load balancer, may require only occasional reliable communications. This occasional but reliable communication can be achieved through a one-time small data transfer between systems disclosed herein.

Detailed information about TCP may be found in Network Working Group's Request for Comments (RFCs) 675, 793, 1122, 2581, and/or 5681, all of which are hereby incorporated by reference herein in their entirety. Implementing TCP, or a portion thereof defined in these RFCs, often requires a number of resources allocated on both computing systems participating in a TCP communication. TCP is a protocol that supports multiple features, including reliable transmission, error detection, flow control and congestion control. These features require memory allocation and processing to be performed by the systems communicating using TCP. For example, TCP uses a sliding window methodology in order to implement flow control. Typical initial TCP window sizes for Ethernet connected computers are around 8K to 10K bytes of data. Buffers that are at least this size must be allocated on both systems (a sending buffer, and a receiving buffer) in order to support the window size. In addition, TCP is a stream based protocol that remains open (with buffers allocated) for the entire connection time. If data is infrequently transmitted between the hosts over the TCP connection, the memory allocation required for TCP remains mostly unused and largely wasted because the data will never fill the buffers entirely. In addition, even quickly ending the TCP connection requires the computing system to constantly build-up and tear-down a TCP connection each time it wants to communicate even a small message, which may take time and cause unnecessary delay in processing the communication to be sent.

According to existing standards, TCP connections are established through a 3-way handshake packet sequence, and are closed through a separate, distinct, closing packet sequence. The initial handshake comprises a TCP SYN packet sent by a first computer to a second computer. The TCP SYN packet is received by the second computer, and is responded to with a TCYP SYN+ACK packet sent by the second computer to the first computer. The ACK part of the packet is an acknowledgement that the first SYN packet was received. The SYN part of the packet requests an acknowledgement from the first computer that the SYN+ACK packet was received. The third part of the handshake involves sending, from the first computer, an ACK packet that acknowledges receipt by the first computer of the SYN+ACK packet sent by the second computer. At this point, TCP is ready to send data, however, during the handshake, no data is sent until the handshake is complete. As an alternative, TCP FAST OPEN is a TCP option that may be used to send data as a part of any packet in the handshake. However, both TCP and TCP FAST OPEN require a separate connection termination procedure involving a separate packet sequence.

In addition, TCP provides functionality that is not useful for small transfers of data. For example, TCP implements various congestion control algorithms including slow start, congestion avoidance, fast retransmit, and fast recovery schemes. These schemes are largely unnecessary when transmitting only one or two packets worth of data between the systems because there is no future "congestion" of the connection to plan for. Instead, any execution of these algorithms may be considered wasted clock cycles under this scenario.

One solution to this problem is to use an existing stateless protocol that has less overhead than TCP, such as User Datagram Protocol (UDP). However, UDP lacks reliable transmission of information. Packet loss does occur in real world networks. Whether it is because of faulty routers, network congestion, or any other reason, there is no guarantee that information sent over UDP will ever be delivered to the destination computing system.

This disclosure describes embodiments of systems, non-transitory computer readable storage, and processes that allow for quick, reliable communication between two computing systems. Advantageously, embodiments described herein utilize a remote messaging networking protocol that can provide both lightweight transport of information without the TCP build-up/tear-down process and that can provide reliable communication between the two parties. In certain embodiments, reliability can be achieved through a three-way handshaking process. In certain embodiments, the handshaking process, in addition to providing reliability, simultaneously transfers the data to be communicated and finishes the connection. The remote messaging protocol may not use a separate connection termination procedure. Instead, the termination can be inherent to the remote messaging protocol. Therefore, compared to TCP, in certain embodiments, the remote messaging protocol economizes on the number of packets by piggybacking data on top of a handshake and eliminating termination packets.

Remote Messaging Protocol Exchange Example

Figure 1:
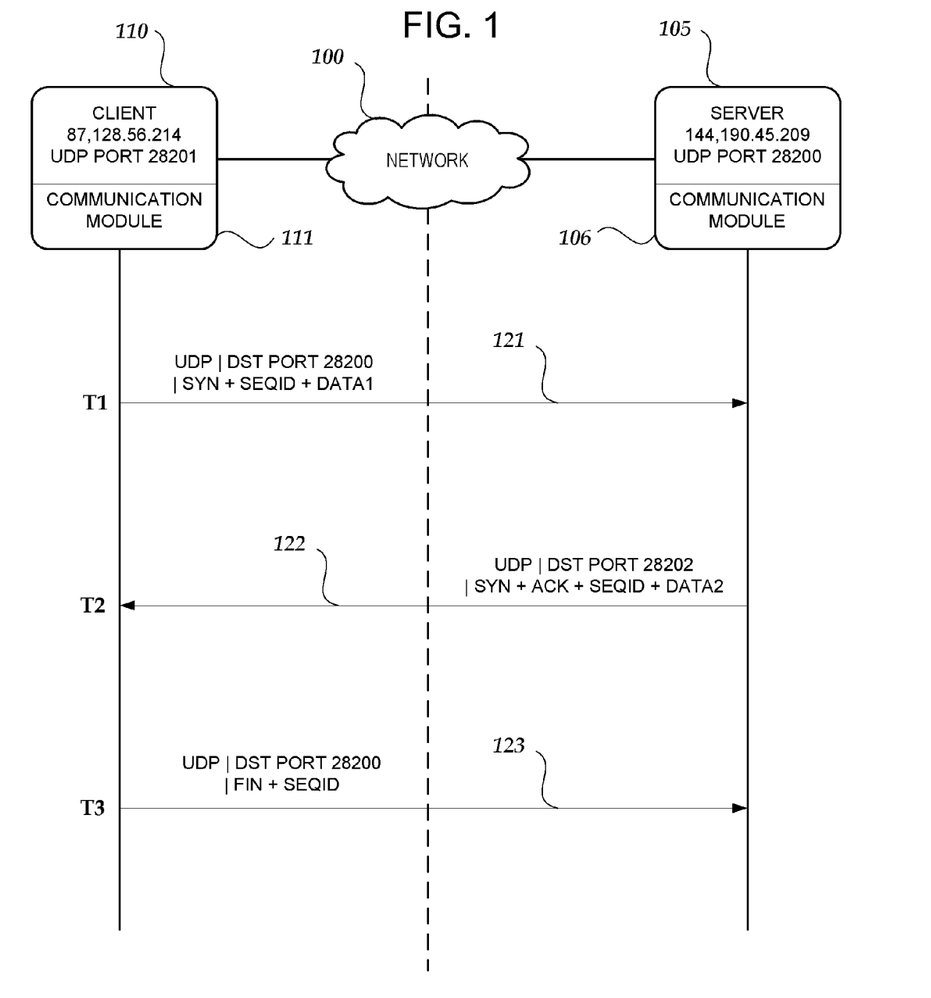
FIG. 1 illustrates an embodiment of two computing systems' network communication.

FIG. 1 illustrates one example embodiment through a network timing diagram. FIG. 1 depicts two computing systems, for example, client 110 and server 105. The client 110 may include a computing system that is attempting to quickly supply a small amount of information to server 105. In some embodiments, this information may be a request to perform some procedure on the server 105 and for the server to provide a response to the request. For example, the client 110 may be a network resource that requires a query from client 110 to a central manager (server 105), and the central manager responding with a resource assignment to the client 110. This context is only by way of example, and the communication described may also be applied to client to client communication, server to server communication, etc. In addition, server 105 and client 100 may include a wide variety of devices containing one or more processors, such as a desktop computer, rack-mountable server, smartphone, tablet, embedded device, or any other device capable of communication on a network.

Network 100 may include any packet based, unreliable/best effort network such as an IP network. For example, it may include the Internet, an internal IP network within an organization, home, etc., or a combination of the Internet and any internal network (e.g. communication between client 110 and server 105 may be across a firewall or network address translation device). The network may include multiple routers (or a single router) that forward packets based on IP addresses between nodes. The packet forwarding by routers may be performed by using information about segments of IP networks that are associated with each of the routers interfaces.

In the example in FIG. 1, client 110 may be assigned IP address 87.128.56.214. Server 105 may have IP address 144.190.45.209 and be listening on UDP port 28200 (for example). At time T1, client 110 sends a UDP packet 121 to server 105. Client 110 may initiate the transmission of this packet by, for example, a service or user application on the client can instruct a communication module 111 on the client to send information generated by the application to server 105 (using its own communication module 106) via the remote messaging protocol. The communication modules 106, 111 may each include a set of software instructions (or alternatively, or in combination, hardware) capable of packaging and initiating sending or receiving of packets using the remote messaging protocol. The communication module 111 may construct a UDP packet 121 that has, as its UDP payload, an additional protocol header with its own packet payload. The client may allocate and use a source port for the UDP packet of 28200, and send off the packet 121 to be routed through the IP network to the destination server 105.

The remote messaging protocol header in the packet may indicate that packet 121 is an initial packet in a packet sequence, commonly known in TCP parlance as a SYN packet. The initial packet 121 may be considered the first packet sent in the remote messaging protocol in a three way handshake that allows the remote messaging protocol to support reliable transport. The remote messaging protocol header may also include a unique identifier that identifies the specific packet sequence (e.g. SEQID as noted in FIG. 1). The unique identifier may be unique amongst all in-flight packet sequences between the client and the server. Additional packets sent or received with this specific unique identifier are considered to be a part of the same packet exchange as the initial packet. In some embodiments, the packet sequence ID may be generated by using a counter (e.g. an iterated value) plus a random or pseudorandom number to guarantee uniqueness.

The packet payload may contain the application-specific information that the application intends to be transmitted to server 105, for example, the data of a request for resource assignment of remote procedure call. Of note, the remote messaging protocol can support both transferring the data between the systems (e.g. the data in the packet payload during time T1) while also initializing the three-way reliability handshake at time T1. In some embodiments, it may be desirable that the total packet size be less than the smallest Maximum Transmission Unit (MTU) of all links between the two hosts (e.g. in some embodiments, less than 1400 bytes). Under this condition, the packet may avoid any IP fragmentation, which may avoid increasing any latency between the systems due to splitting the packet, and avoid the increased chance of packet loss when packets are fragmented.

Because of potential packet loss, packet 121 is not guaranteed to be transmitted to the server. Thus, packet 121 may be queued for retransmission based on a dynamic or statically configured timer.

Assuming the server received initial packet 121, the server (for example, a communication module executing on the server) may store the packet sequence ID associated with the received packet, and communicate the payload data to a process executing on the server. The server process may perform some processing of the payload data received. For example, if the data in packet 121 was a request for an assignment of some computing or network resource, the server may allocate that resource and respond with an assignment to the client. If the data in packet 121 was a remote procedure call, the server may perform the procedure call and respond with an acknowledgement that the call was performed, and/or any output from the call.

At time T2, the response may be sent via a server's communication module to the client by sending/transmitting packet 122 to the client. Packet 122 may include a UDP packet 122, with source port 28200 and destination port 28200 for the client system.

The payload of the UDP packet 122 may be the remote messaging protocol's packet header and payload. The header of the remote messaging protocol may include an acknowledgement that the new packet was received, and further include the same unique packet sequence ID (SEQID) so that this packet will be associated with the first packet 121 that was sent by the client.

The payload of the remote messaging protocol portion of packet 122 may include the response generated by the server process. In some embodiments, no payload need be sent and the packet may instead only include an acknowledgement of the receipt of the packet.

At this time, if packet 122 has been received by the client, the client (e.g. its communication module) has knowledge that the transaction was complete. However, the server (e.g. its communication module) does not have knowledge that the reply was received by the client. This lack of knowledge means, in certain embodiments, that packet 122 may be queued for retransmission by the server to guarantee delivery.

Thus, at time T3, the client's communication module may send packet 123 to the server to inform the server that the packet 122 was received. When packet 123 is transmitted, it may be a UDP packet with destination port 28200 corresponding to the server's UDP listening port for this remote messaging protocol. Port 28200 is an example port, but any unreserved port number (or multiple port numbers) could be used. The UDP payload may contain the remote messaging protocol header, which may include an indication that the server's packet was received and the packet sequence identifier (SEQID). Once the server receives this packet, the server's communication module may have knowledge that the response packet 122 was received, and packet 122 need not be retransmitted.

Advantageously, in certain embodiments, unlike TCP, the remote messaging protocol disclosed herein supports a reliable 3-way handshake while simultaneously, and in the same packets, transmitting application-specific data (e.g. application layer data) between the two systems. This combination of handshake and application-specific data can allow for reliable transfer of data between the two systems with less overhead, both in terms of packets sent and resources used (e.g., because no TCP allocation may be required). In addition, unlike TCP, in certain embodiments the remote messaging protocol does not require a separate tear-down process. The three-way handshake can be a combined open and close process, whereas TCP usually requires a separate handshake to close a socket, e.g. 1) FIN 2) ACK+FIN 3) ACK. Using the remote messaging protocol, this finishing sequence may not be required. Instead, in certain embodiments, the packet sequence is implicitly ended in response to either sending or receiving the final FIN, or via a timeout.

Some embodiments may contain other information within the remote messaging protocol packets and have different functionality, some examples of which are described below. Additionally, in some embodiments, UDP is not used in the remote messaging protocol. Instead, this protocol may be layered on top of any layer 3 networking component such as any IP protocol or datagram protocol, and the remote messaging protocol may provide its own multiplexing functionality, such as by implementing a port scheme within the remote messaging protocol's header itself.

Network Environment Overview

Figure 2:
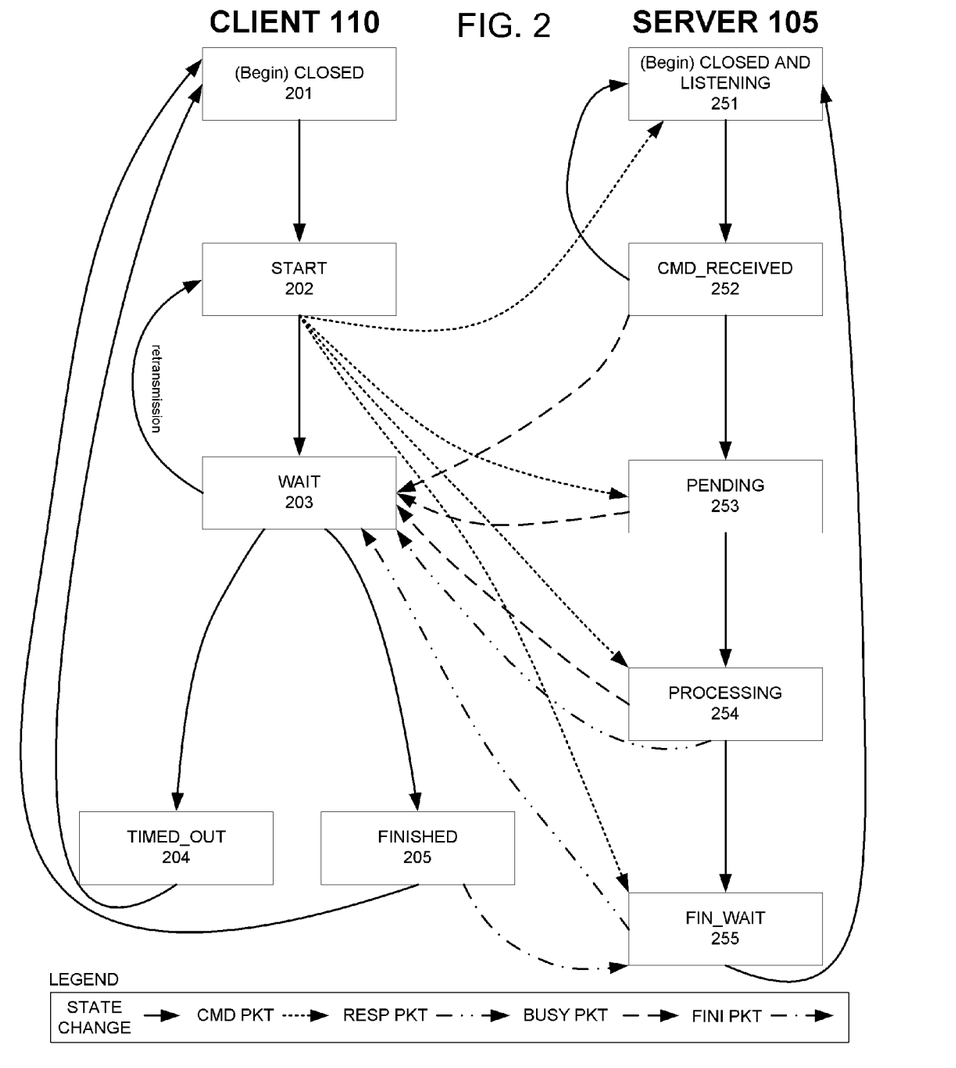
FIG. 2 illustrates a combined state diagram for communication between two computing systems used in some embodiments.

FIG. 1 above illustrates an example case when no packet loss has occurred, and no retransmissions are performed. FIG. 2 illustrates how, in certain embodiments, the remote messaging protocol promotes reliability through retransmission capabilities. Similar to FIG. 1, FIG. 2 illustrates a state diagram for a client and server using the remote messaging protocol to communicate. Like in FIG. 1, the client and server designations are shown for ease of understanding, and the communication may initiate from any computer system supporting the remote messaging protocol to any other computer system accepting communication over the remote messaging protocol. In this example, the client may be sending remote procedure command data ("CMD") to the server for execution using a single packet, and the server may send a one packet response.

In some embodiments, a communication module may be a set of instructions (or alternatively hardware) capable of packaging, and initiating sending and receiving of packets using the remote messaging protocol. Initially, the communication modules of the client 110 and the server 105 may begin without an open connection of the remote messaging protocol (201, 251). The server 105 may be listening on a UDP port allocated for listening to messages using the remote messaging protocol 251. It should be noted that, as an example, one remote messaging protocol packet sequence is discussed with respect to FIG. 2. Other remote messaging protocol packet sequences may be tracked and implemented by the communications module, and their associated server 105 and client 110 states may be occurring in parallel (e.g. for one packet sequence, the client could be in the Start 202 state, and for another packet sequence, the Finished 205 state).

When the client 110 has a command to send to the server, the client may invoke the communications module 111 and pass to it the command and the server (e.g. the IP address or domain name, etc.) it would like to send the command to. The client's 110 communication module 111 may then move to the start state where it begins to construct the request packet to be transmitted to the server. This packet may include, in the header of the packet, a message type, a protocol version, a request ID (e.g. a packet sequence identifier), a timestamp used for calculating round-trip-time, a message payload offset, and/or a request durability TTL. The packet may also include the payload of the packet (e.g. application information/request made by client).

The message type may indicate that the packet is an initial packet (e.g. a CMD packet). The protocol version may indicate to the server which version of the remote messaging protocol to use to interpret the packet header. For example, protocols may have multiple versions that may have slightly different packet header structure. The protocol version may inform the receiver of a packet which header packet structure should be used to interpret the header.

The packet sequence identifier (e.g. a request ID), as explained above, may be a unique ID. The packet sequence identifier may be used to multiplex the requests sent to the server. The packet sequence identifier may be used to track the state of a current packet exchange at either a client, or the server. The packet sequence identifier also allows computer systems implementing the remote messaging protocol to associate initial packets (e.g. CMD packets), response packets (e.g. RESP packets), final packets (e.g. FINI packets), and/or busy packets together.

As explained in more detail below, the timestamp may be used by a computing system's communication module to calculate an expected round-trip-time that can be used to adjust retransmission queue times. The message payload offset may be used to indicate at what point in the packet the payload information begins. The message payload offset indication may be useful because different packets, and different versions of the remote messaging protocol, may have various header sizes to the packets. By using a payload offset, a computer receiving a packet may be able to determine where the payload begins (and thus read the data in the payload of the packet) despite the header changing in size.

The request durability TTL can be a TTL that may be transmitted to the server (e.g. a time value). The server receiving the request durability TTL may use this value to assist in setting a retransmit timer for a response packet, as described below. In some embodiments, the TTL value may indicate a WAIT state. This WAIT state may be indicated by using a special TTL value (e.g. sending the field to all 1s, etc) as understood between the systems. Using this TTL value may instruct the server to retransmit a packet until a FIN packet is received (e.g., there is no time to live for retransmissions). This TTL value may be ignored by the server if unable to retransmit indefinitely, or may instead be interpreted by the server to set a TTL to a longer, pre-set time. The TTL value may also be used to describe priority of a request, as disclosed further below.

The packet may then be transmitted to the server 105, as represented by the dotted lines from START state 202, to states 251, 253, 254, and 255. In addition, a timeout timer may be set that indicates when to abandon attempting to communicate this particular message to server 105.

In most cases, this packet will be received by the server when in the CLOSED/LISTENING state 251. When received in this state, the server may transition to the CMD_RECEIVED state 252 after recognizing that a new command has been received. In other embodiments, this state need not be regarding receiving a remote command, but could be another similar state that represents that the initial payload of the packet has been received, and after transitioning through other states, a reply will be issued to the sender of the data.

In other cases, such as when the packet received by the server 105 is a retransmission packet for a packet sequence that was previously received from the client 110, the packet may be received by the communications module while in another state, such as states 253, 254, and 255. In these cases, because the server may already be operating on the original request/packet received, then the server's 105 communication module 106 may transmit a "busy" packet to the client 110. The busy packet indicates to the client 110 that the server 105 may be either too busy to handle the request currently, and/or the request may be already being processed. In either case, it may include a message id, a protocol version, the packet sequence it is responding to, and the timestamp of the received packet. Reception of a busy packet may indicate to the receiver to slow down the rate of retransmission of packets (for example, the packet was already received previously and is being acted upon, and thus retransmission may not be needed, or the queue for handling requests may be full).

In addition, returning to state 251, this state could also transmit a busy packet if there may be any reason that the server 105 cannot handle the request or otherwise process the packet. For example, using the example of a remote procedure call (RPC) to a process on the server, if the process is too overloaded or unable to process the request (e.g. the command queue for execution is full), the server may, at state 251, immediately transmit a busy packet to the client to indicate that the request isn't being processed.

Once the client's 110 communication module 111 has transmitted the initial packet (e.g. the CMD packet) to the server 105, the client's 110 communication module 111 may enter the WAIT state 203. In this state, there are a number of triggers to progress to another state.

First, when entering the WAIT state 203, the client's 110 communication module 111 may queue the initial packet for retransmission based on a timer. Assuming the client's 110 communication module 111 is still in the WAIT state when the timer expires (e.g. no reply packet has been received), the communications module will transition again back to the START 202 state where the queued initial packet may be retransmitted. The timer itself may be based on the round trip time to the server, or other network round trip times. For example, the client may be collecting past round trip times from previous communication with the server 105. This time may be collected by analyzing the timestamps in the replies from server 105. The difference/subtraction between the current time and the timestamp of a packet received from the server (which in turn copied it from a packet originally sent from the client) can allow the client 110 to effectively measure the time it took for a packet to be responded to by the server 105 (e.g. a round trip time, RTT).

By calculating these round trip times, the client may calculate an average RTT (mean, mode, median, weighted moving average, etc.) that it expects to receive a reply in. The client's 110 communication module 111 may then use this average/estimated RTT to calculate a timer to wait for retransmission. For example, in some embodiments, the timer may be equal to twice the RTT. In other embodiments, it may be four times the RTT. The timer may be adjusted based on feedback (or lack thereof) from the server 105. For example, if a BUSY packet is received by the client, or if no reply is received, the timer for the next retransmission by the client after entering WAIT 203 state may be multiplicatively increased, for example, by being doubled, tripled, etc, or even exponentially increased.

Second, in the WAIT 203 state, the timeout timer could expire. The timeout timer, set as described above in response to transmission of the first packet in the packet sequence, determines when to abandon transmission of the information to the server 105, and to return an error code to the client application requesting transmission of the data. This timeout timer may be different than the retransmission timer, in that the communications module may attempt to retransmit the packet multiple times before the timeout timer expires. When the timeout timer expires, a computing system's communication module progresses to the TIMED_OUT 204 state, and requesting process/application on the client may be informed by the communication module that transmission of the application's data to the server was unsuccessful. In addition, the communication module may remove the initial packet from the retransmit queue.

Third, while in the WAIT 203 state, the client's 110 communication module 111 may receive a RESP type packet from server. In this case, the client's 110 communication module 111 may transition to the FINISHED state 205, which is explained further below, and remove the initial packet from the retransmit queue. Any data contained within the payload of the RESP packet may be sent to the application initiating the packet sequence so that it may process this data.

On the server 105 side, after the initial packet from the client has been received (e.g. either the first packet transmitted, or, if that packet did not reach the server, a retransmitted packet), the server's 105 communication module 106 as described above may progress to a state where it has received the packet. Here, in this example, that state may be CMD_RECEIVED 252, which indicates that the remote procedure call (RPC) has been received by the server 105 and the command is queued for processing.

The server may then take some action before transmitting a response. In this example, the server may enter a PENDING state while the command is waiting to be executed 253. Then, the server may progress to a PROCESSING 254 state when the command is actually being executed on the server. After execution, the executing process may return to the communications module information to be transmitted to the client in response to the executed command.

The communications module may then create a second packet (e.g. a RESP/response type packet) that may include a message type indicating a RESP packet, a protocol version, the request ID the packet it is responsive to (e.g. the packet sequence number), the timestamp received from the original request (e.g. it is echoed back to the client so that it may calculated RTT), and a message payload offset. The payload of the packet may include any information returned by the server process, such as an indication that the command executed successfully, an assignment of resources, or any other information that may fit within a single packet. This packet may then be transmitted to the client computer, for example, as shown in FIG. 2 by a RESP packet being transmitted from the PROCESSING 254 state to the client. In some embodiments, a RESP packet may be transmitted to the client to acknowledge the receipt of the initial packet, but without a packet payload.

In addition to sending this packet, the processing state 254 may queue this response packet for retransmission and set a timer for retransmission based on RTT estimates. These estimates may be based on an RTT value calculated from previous communications with this client or near network clients (e.g. on the same subnet or portion of a network), or by estimating the RTT by some other means. In addition, based on the initial packet's request durability TTL, a TTL may be set to stop retransmission. For example, if the request durability TTL is set for one second, then the server's 105 communication module 106 may set a TTL for retransmission of the response packet to one second.

Thereafter, the server's 105 communication module 106 may enter a wait state. During this wait state, the server's 105 communication module 106 may retransmit the response packet based on the retransmission timer. In one embodiment, each time the timer expires, the communication module may retransmit the packet to the client and reset the timer. This time for retransmission may end either 1) when the server receives a FINI packet (explained below), or the TTL expires to stop retransmission. If the server receives a FINI packet, the retransmission packet may be removed from the retransmission queue and the communications module may proceed to state 251 where it may wait additional initial packets (in addition to de-allocating any resources used to queue retransmission of the response packet). If the TTL expires, the response packet may also be de-queued and the state transitioned to closed/listening 251. For example, if the request durability TTL was set to one second above, after one second, the server's 105 communication module 106 will cease retransmitting the response packet and proceed to state 251, awaiting new packet sequence connections. This retransmission is represented in FIG. 2 as a RESP packet being sent to the client from the FIN_WAIT state 255.

Returning to the client side, when a client's 110 communication module 111 enters the FINISHED 205 state, the client may create a final acknowledgement packet (e.g. called a FINI packet in FIG. 2). The purpose of the FINI packet may be to complete the three-way handshake and inform the server that no more retransmissions are needed for the response packet. The FINI packet may include in its header a message ID indicating that the packet is a FINI packet, a protocol version, and a packet sequence identifier (e.g. the request ID to matchup with the packet queued for retransmission), although other header values may be transmitted to maintain packet header structure. The FINI packet need not have any payload. Once this packet is transmitted from the client to the server, the communication module may transition to the closed state 201.

Transitions from state to state in FIG. 2 may be implemented in a different order, or certain states may be removed. For example, in some embodiments, the PENDING 253 and PROCESSING 254 states may be combined into one state. Additional states may also be added, such as a state after the FINISHED state that de-allocates resources for a finished communication.

Remote Messaging Protocol Example Packet Structure

Figure 3:
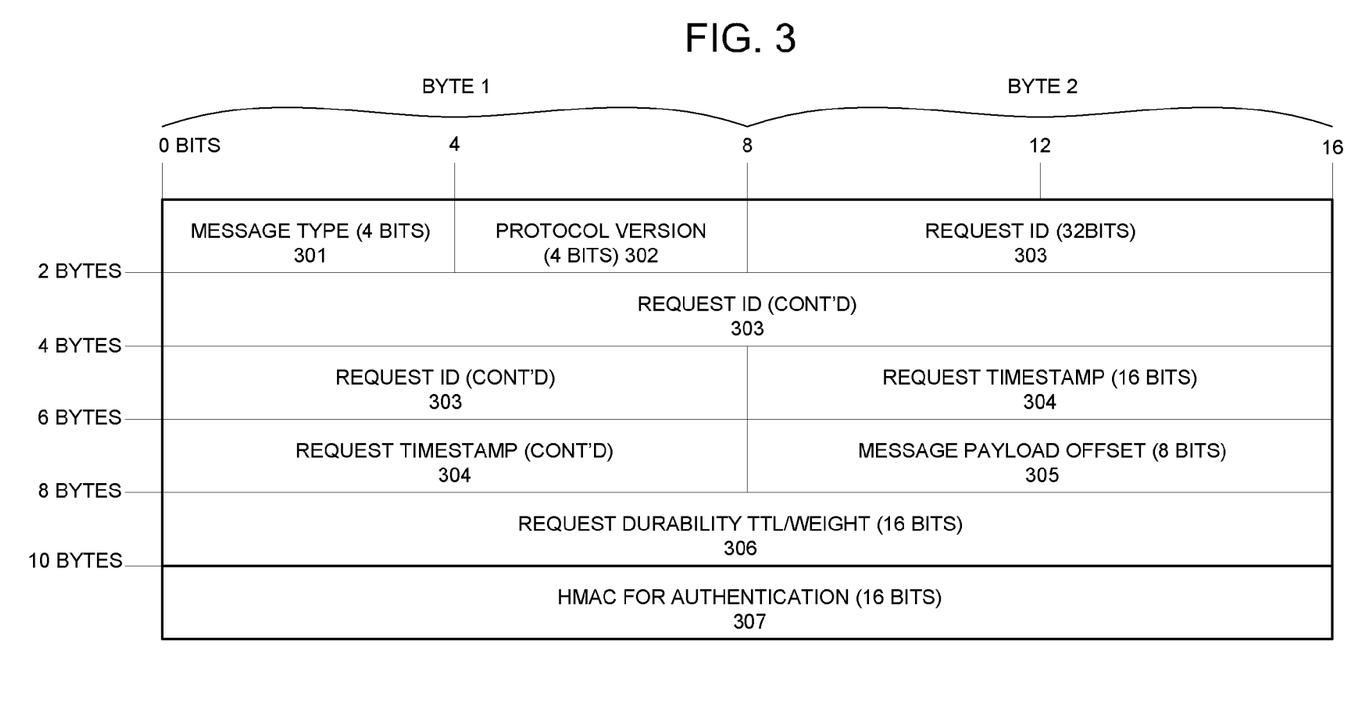
FIG. 3 illustrates an embodiment of a data structure for communication between computing systems.

In order to implement the remote messaging protocol, a packet structure may be used. FIG. 3 discloses one sample embodiment of the packet structure, but other packet structures may be used (including other field lengths for each header field) and are covered within the scope of this disclosure.

FIG. 3 discloses one embodiment of the remote messaging protocol's packet structure. Not all fields represented in FIG. 3 are necessary for the protocol to operate by combining a three-way handshake with the transfer of data between two systems, but each field may be helpful depending on the requirements for a particular implementation. FIG. 3 illustrates a sample CMD packet data structure header, but can be used to understand other packet data structure headers as well. FIG. 3, from describes one embodiment's ordering of the packet header data fields from left to right, and from top to bottom, with each row representing 16 bits. Other orders of the fields, bits, and bytes may be used instead.

The first field 301 may be for the message type. This communicates to a computing system receiving this packet that the packet may be a particular kind of message—for example, an initial packet (e.g. CMD), a response packet (e.g. RESP), a final packet in the handshake (e.g. FINI), or a busy type packet. In this embodiment, it is a four bit field. Each message type may have its own 4-bit code according to a message convention (e.g. CMD-0000, RESP-0001, FINI-0010, BUSY-0011). Other codes are also contemplated, such as an 8-bit code (e.g. CMD-00000000, RESP-00000001, FINI-00000010, BUSY-00000011).

The second field, 302, may be for communicating the remote messaging protocol version. The protocol may support multiple versions having multiple header formats. Thus, a different bit sequence in this field may indicate the proper remote messaging protocol version to be used to analyze the packet. This field may also be a 4-bit field. Versions of the remote messaging protocol may also be backwards and forwards compatible, as described below when describing message payload offset 305.

The third field, 303, may be the packet sequence identifier, e.g., the request ID. In this embodiment, it is a 32-bit field. This field may be unique among all in-flight handshakes between two computing systems. This uniqueness allows each computing system to multiplex the remote messaging protocol and uniquely track the state of each packet handshake sequence. In one embodiment, this field can be generated by using a 16-bit sequence counter and 16 bits of a random or pseudo-random number. This process for generating unique numbers can allow sequence numbers to be fairly unpredictable while in some embodiments also being guaranteed-unique, over a time period until the counter resets, in a window of at least 65536 values.

The fourth field, 304, may be the request timestamp. This field can allow a computing system to measure the RTT between the systems. For example, this field may be a 16 bit sequence that represents a timestamp for when an initial packet may be sent. As a part of the handshake sequence, this RTT may be echoed back in a response packet by the computing system that received the initial packet. When this response packet is received, the computing system sending the initial packet can determine the amount of time it takes to make a round trip between the two computing systems (e.g. by subtracting the timestamp from the current time). This determination can allow the computing system sending the initial packet to adjust their retransmit timers based on the calculated RTT between the two systems. For example, an initial retransmit timer may be set to two times the RTT.

This field may also be used to monitor RTT between the two computing systems over time. For example, the computing system issue periodic requests simply to have this field echoed by the other computing system so as to track, over time (e.g. calculate a moving average) of RTT. If the two computing systems have no history, and thus no average RTT time to use to set initial retransmit timers, then a default value can be used for these timers, such as 100 milliseconds. In some embodiments, RTT history may also be tracked not based on host, but on groups of hosts. For example, an average RTT may be calculated for a subnet, or for any fraction of a network that may be grouped together. These average RTT calculations may be used to seed RTT values for new hosts that are communicated to with the remote messaging protocol.

These fields, 301, 302, 303, and 304 (or any combination thereof of these fields and additional fields explained below) may be used as a set of headers for all message types. Additional headers may exist in other message types. For example, a CMD packet may have more header fields than a RESP packet.

Field 305 may be a message payload offset. This field may be an 8-bit field that represents an offset that indicates where in the packet the message payload begins. This field can allow remote messaging protocol version mismatches to be backwards and forwards compatible. This field can allow any packet header field that may be known to version N to also be known to version N+K for all K greater than or equal to 0, given that those fields do not change locations. Any packet where there may be a message payload may have this 8-bit offset into the packet for the start of the payload. Thus, if fields are added to the packet header at the end in later versions of the remote messaging protocol, the other end can still get at its recognized fields and the message data even if the protocol version may be newer by using the offset to determine where in the packet the payload starts.

Field 306 may be a request durability TTL or request durability weight. This field may be used in initial packets (such as a CMD packet), or any packet where it may be helpful to transmit timeout information. For example, in an initial packet (e.g. a CMD packet), the transmitting computing system may set a 16-bit time into the request durability TTL field. This field may indicate the point in time when the computing system's request will timeout, and no more retransmissions from the computing system will occur. This field may also communicate the amount of time that the receiving computing system should use for its timeout. For example, the receiving system may calculate the timeout value the transmitting computing system may be using by subtracting the two values, and use that value to set the TTL on its retransmissions for the reply packet. This value need not be an absolute time, and instead could be a time offset from the request timestamp.

In addition, this value can be an expectation or suggestion to the receiving computer system instead of a mandate that a certain timeout value will be used. Value 306 may also be used instead as a timeout weight instead of a TTL. A timeout weight, unlike a TTL, may indicate a priority for timeout value (or priority for a process to run) instead of an exact timeout value. Any scale of weight may be used so long as it is understood by both the transmitting and receiving systems of the protocol. For example, if both systems use a weight of 1-100 (as one example range, with 1 being the highest priority), transmitting a 3 on the scale to the receiving system may be interpreted by the receiving system as high priority, and may correspond to the receiving system implementing a large TTL for transmission of packets back to the initiating computer system. A relatively lower priority value, such as 89, may instead be treated by the receiving system as unimportant and cause the receiving system to use no TTL at all for replying packets (e.g. no retransmissions will occur). Similarly, the relatively lower value may indicate to the receiver that the sender of the packet with the low priority request durability weight has a low TTL for expecting to receive a response to its packet. In some embodiments, it may be advantageous to implement this priority weight feature with HMAC authentication (described below) so that only trusted clients may affect the TTL on a server or a priority of process executing within a server.

In some embodiments, the request durability TTL may be set to a very low value. This low value may indicate to the server that the client is not expecting any response in return, or vice versa (if the server is sending the request durability TTL).

In some embodiments, field 307 may be used to provide authentication and data integrity for the packet. For example, using 16-bits, a hash message authentication code (HMAC) may be calculated over the header (one or more fields) and/or payload of the packet in order to authenticate the sender of the packet. Any number of bits may be used for the HMAC, with more bits increasing the security. For example, if the transmitting computing system and the receiving computing system (e.g. the client and server) have a shared secret between them, a hashing algorithm may be used to enhance security and data integrity of the packet. The transmitting system may hash (e.g. SHA1, MD5, etc.) the packet header (excluding the HMAC field) and the payload together (or just the payload), and then rehash the output with the concatenated shared secret (or use any other method of hashing the header, payload and shared secret together). The resulting output, which in some embodiments may be 16 bits, may be stored in the packet header. When the packet is received by the receiving computer system, that system may use the same shared secret and hashing algorithm to hash the header (w/o the HMAC field), the payload (or the payload w/o the header), and the shared secret together. This output can then be compared to the HMAC field. If there is a match, then the packet may be considered authentic, and data integrity verified. If the output doesn't much the HMAC header field, then the packet may be either not authenticated or has a data integrity problem (e.g. an error inserted into the packet during transmission). Thus, in that case, the receiving computing system may ignore the packet. Instead of using a hash message authentication code, in some embodiments, a symmetric or public/private key encryption code or encryption of the entire request or header portions thereof may instead be used to authenticate packets of the remote messaging protocol.

In order to avoid replay attacks, the hash may be calculated over the header (or instance specific subset thereof, such as the timestamp and the session ID (noted as the request ID in FIG. 3)), and the timestamp can be analyzed to guarantee that the packet was sent and hashed within a certain amount of time of the current time (e.g. within 10 minutes or some other time period to take into account variances in system clock times). The shared secret may be distributed between the two systems through known out-of-band means, such as through administrators manually transferring the secret through phone, email, or voice, or through a TCP socket, or other method to assist in shared secret exchange. Public-key/private-key encryption (some times referred to as asymmetric encryption) may also be used, where each message may be digitally signed or encrypted with a private key by the sender, and verified or decrypted with a public key available to the receiver.

One advantage of using HMAC authentication in certain embodiments is that HMAC authentication may prevent or reduce the effectiveness of certain types of attacks such as replay attacks, or denial of service attacks. Any packets that do not have a valid HMAC field may be ignored as coming from an untrusted source, which may save a server receiving the packets from performing the process or command described within the packet.

In some embodiments, a negative acknowledgement packet may be used instead of an acknowledgement/response packet. A server may transmit this type of packet to a client after receiving an initial packet that had an error or could not be authenticated via the HMAC. A client that receives this type of packet may be informed to either change HMAC keys for their request, encrypt the request differently, and/or resend the request packet to correct any errors.

EXAMPLE EMBODIMENTS

Figure 4A:
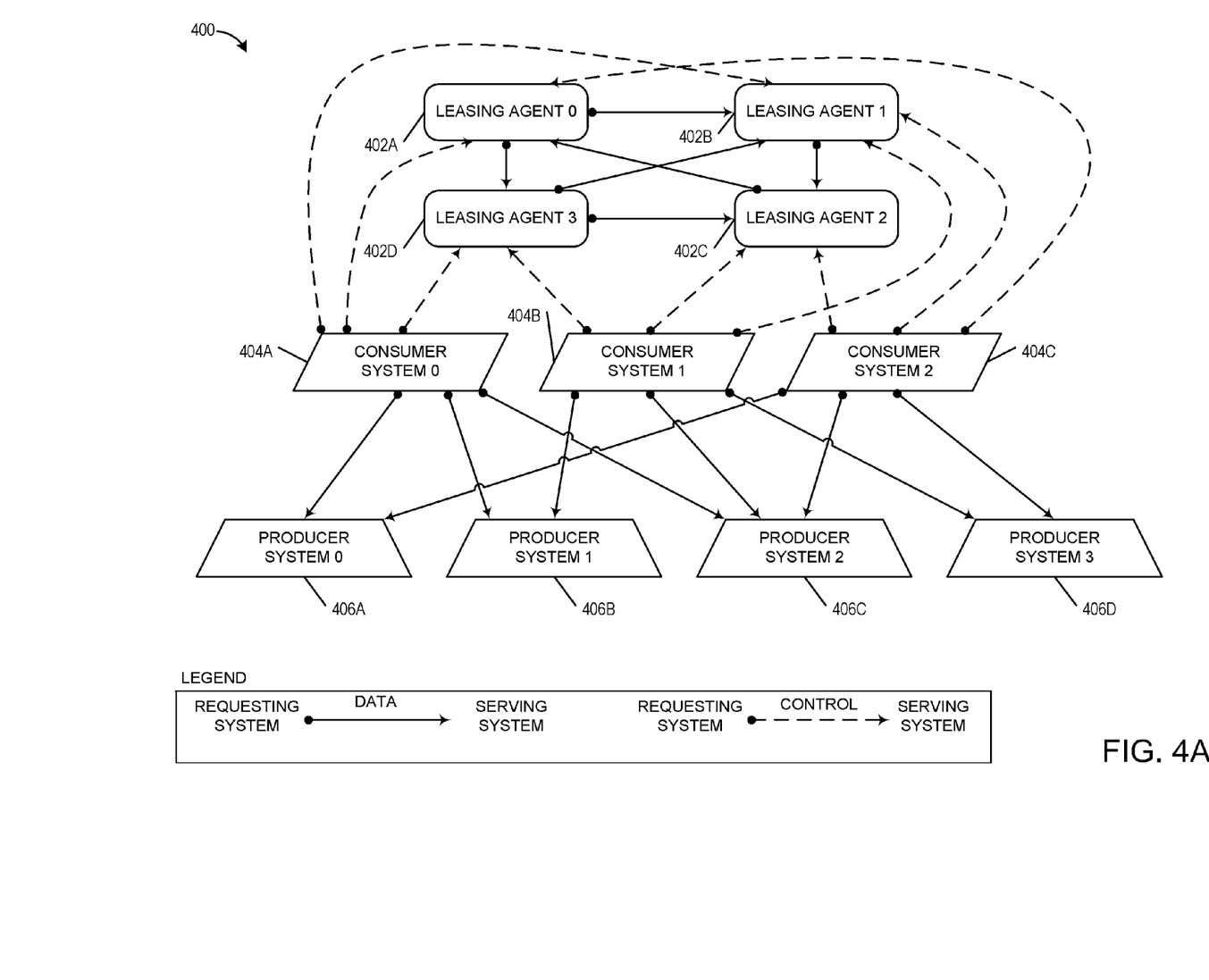
FIG. 4A illustrates an embodiment of multiple computing systems conducting interprocess communication.

FIG. 4 illustrates an embodiment of a network environment 400 for providing consumer systems 404 with access to services hosted by producer systems 406. This embodiment may use the remote messaging protocol for quick and reliable communication in a software load balancing scenario that can advantageously avoid use of a single hardware load balancer. Other example use cases for the remote messaging protocol(s) described herein are set forth below.

The network environment 400 can include a number of producer systems 406A-D and consumer systems 404A-C. Although four producer systems 406 and three consumer systems 404 are illustrated, the network environment 400 can include any number of producer systems 406 and consumer systems 404 in one or more data centers. In some embodiments, the network environment 400 may be associated with a particular entity or organization. In such embodiments, at least some of the consumer systems 404 may represent user or customer computing systems that can communicate with the network environment 400, but which may be under the control of an individual or separate entity than the rest of the systems associated with the network environment 400.

Generally, each of the producer systems 406 are capable of providing a service and/or computer resource to a consumer system 404. In some cases, the producer systems 406 may each be capable of providing the same services and/or resources to a consumer system 404. In other cases, at least some of the producer systems 406 may be capable of providing different services and/or resources than other of the producer systems 406. These services and/or resources that are provided by the producer systems 406 can include any type of service and/or computing resource. For example, the services and/or computer resources can include: data storage access; external network access (e.g., access to the Internet); internal resource access (e.g., access to databases managed by the same entity as the network environment 400); access to catalog services; access to directory services; access to an application; access to processing services (e.g., for distributed processing of a command or request); etc.

The producer systems 406 can include any type of computing system, comprising one or more processors that may execute code to implement their functionality. For example the producer systems 106 can include a client system, a server (e.g., an application server, a web server, etc.), a laptop, a desktop, a database system, a backup system, a directory system, a deduplication system, a storage system, and the like. Similarly, the consumer systems 404 can include any type of computing system. For example, the consumer system 404 can include a client system, a server, a laptop, a desktop, a tablet, a mobile phone, a gaming device, a television, etc. In some embodiments, a consumer system 404 can also serve as a producer system and vice versa. For example, one consumer system 404 may access a producer system 406 to obtain data (e.g., a producer system that serves as a database system or a storage system). The same consumer system 404 may also serve as a producer system by, for example, providing application access to another consumer system 404. In some cases, the consumer systems 404 and the producers systems 106 can be considered client and server systems respectively. However, as discussed above, the consumer systems 404 and the producer systems 406 are not limited as such.

Each time a consumer system 404 desires or requires access to a service provided by a producer system 406, the consumer system 404 can access one or more leasing agents 402A-402D (which may be referred to herein singularly as "a leasing agent 402" or in the plural as "the leasing agents 402") to request access to a producer system 406 capable of providing the service. Such a request may be performed using the remote messaging protocol described above. Generally, a consumer system 404 accesses some subset of the leasing agents 402 to obtain the identity of a producer system 406 to access to fulfill the service request. For more information about leasing, producer, and consumer system interactions, see U.S. patent application Ser. No. 13/927,892 which is fully incorporated herein by reference.

FIG. 4 illustrates one example of the communication between the leasing agents 402, the consumer system 404 and the producer systems 406. As can be seen in FIG. 4, each of the consumer systems 404 communicate with three of the four available leasing agents 402. As indicated by the broken arrows, this communication may include control data information including, for example, control data information relating to requests to access a service provided by a producer system 406 and/or a request to access a producer system 406. These requests may be performed by using the remote messaging protocol. Each request may use a small amount of data (e.g., a query for a producer system to access (the initial packet) and a reply specifying the producer system to access (the replay packet)). The data and the reliability handshake may be combined into two packets, with a third packet to complete the handshake, by using the remote messaging protocol.

Further, as indicated by the solid arrows connecting the consumer systems 404 to a subset of producer systems 406, additional communication may include data relating to the producer systems 406 servicing service requests by the consumers 404. In addition, the leasing agents 402 may communicate among themselves to provide, for example, status information relating to the leasing agents 402 and/or the producer systems 406. These types of data exchanges may not require constant open TCP connections. Instead, these types of data exchanges, like the control data described above, may involve very simple request and reply responses. These types of interactions may use the remote messaging protocol, and its combined three way handshake and data exchange, to provide connectivity between the systems without requiring TCP teardown or all of the features of the TCP protocol.

For example, a request for status from a leasing system to a producing system may include an initial UDP packet comprising, in the remote messaging protocol's packet header, a packet sequence number, a request message id, and a payload with the status request. The producing system may respond with a UDP packet comprising, in the remote messaging protocol's packet header, the packet sequence number, the response message id, and a payload with the status of the producer system. Each of these packets may be queued for retransmission when sent as described above. The leasing system may transmit a final "FINI" type UDP packet to the producer system, where the remote messaging protocol's header may comprising a "FINI" type message id, and the packet sequence.

The remote messaging protocol can also provide advantages for systems that are not optimally using TCP or UDP. For example, in some embodiments, systems that use UDP, as typically implemented for online gaming, may instead use the remote messaging protocol to provide both quick messaging, lightweight messaging in addition to reliability. Online game currently relies on heavy use of UDP so as to reduce latency between communicating systems, but at the cost of reliability. Instead, an online game using the remote messaging protocol disclosed herein may have reliable communication without the costs associated with using TCP to do so. A message may quickly pass from gaming server to gaming client and vice versa without setting up or tearing down a TCP connection.

Figure 4B:
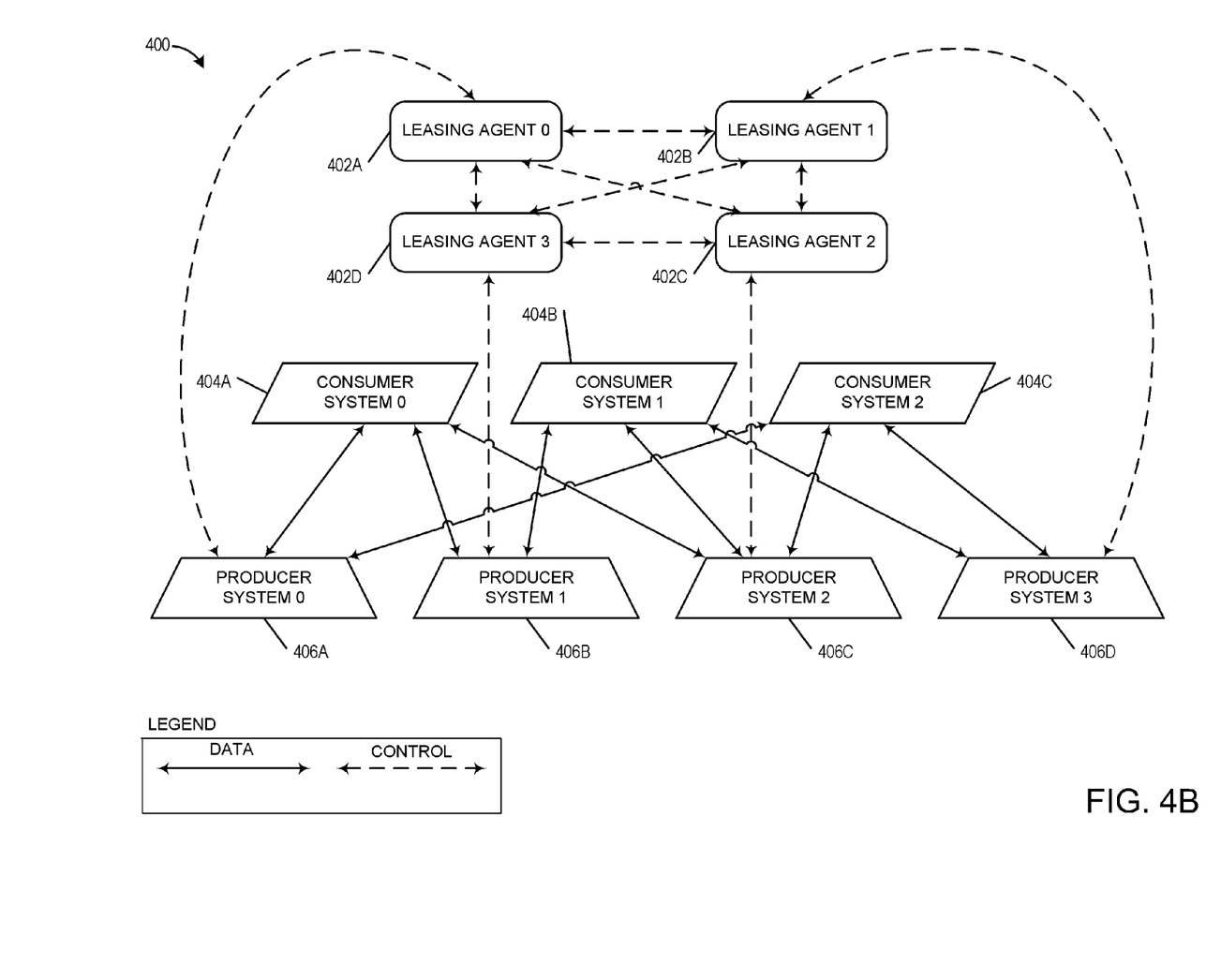
FIG. 4B illustrates an embodiment of multiple computing systems conducting interprocess communication.

In another embodiment, the remote messaging protocol can assist in communication between producer systems and leasing agents. FIG. 4B illustrates the network environment 400 for providing consumer systems 404 with access to services hosted by producer systems 406 and for providing producer system health information to one or more leasing agents 402. As illustrated in FIG. 4B, in some cases, data can be provided both from the producer systems 406 to the consumer systems 404 and from the consumer systems 404 to the producer systems 406. In other words, in some cases, data communication can be bidirectional.

Further, the producer systems 406 can provide health information to the leasing agents 402 thereby enabling the leasing agents 402 to track which producer systems 406 are functioning and which producer systems 106 have resources available to assign to a consumer system 404. In some cases, the producer systems 406 may provide the health information at a scheduled time. In other cases, the leasing agents 402 can request or ping the producer systems 406 for health information. Often, each producer system 406 is assigned to a single leasing agent 402 as illustrated by producer systems 406A-406C. However, in some embodiments, a producer systems 406 may be assigned to multiple leasing agents 402, as is the case with the producer system 406D.

The information flow between a producer system (e.g. 406A) and a leasing agent (e.g. 402A) to provide health information may be implemented using the remote messaging protocol. For example, the transferred health information about the producer system 406A may be sent using application specific data in the packets, such as a plurality of information update packets over time. This information flow could include many initial packets being sent from the producer system 406A to one or more leasing systems. The constant flow of health data that may come from the producer system 406A may be important overall for operation of the system, but each individual packet need not be important. For example, leasing agent 402A may not use some or all health data packets to be received from the producer system 406A because packets may quickly follow one another in a flow, and the health status will be updated soon after any packet is missed.

For example, a first initial packet may be sent from the producer system 406A to the leasing agent 402A instructing the leasing agent 402A to update health status information for the producer system 406A to certain value(s). This first packet may have a session/request ID of 0001 (as an example). Soon after, a second initial packet (having a session/request ID of 0002) may be sent from the producer system 406A to the leasing agent 402A with another status update about health information. If the leasing agent 402A never receives the first packet, but does receive the second packet, the health status may still be updated as of the time the second packet is received (and the second initial packet acknowledged in a response). Thus, each individual packet may not be particularly important to be received because each subsequent packet may fix the errors of previously missed packets.

In such an embodiment, the TTL used by the producer system 406A may be quite low. This low TTL may be used because any retransmission of the first packet may not be necessary—a second packet with a newer update may be sent shortly afterwards by the producer system 406A to the leasing agent 402A. In this scenario, it can be advantageous for both the producer system 406A and the leasing agent 402A to set their TTLs to a low value because retransmission may not be important for each individual packet (and therefore the systems should only try to retransmit for a limited amount of time, or not at all). Thus, the producer system 406A may set its TTL to a low value, and set an initial packet's requested durability TTL to a low value as well to inform the leasing agent 402A to set a low TTL and/or describe the low importance of the packet.

Conversely, if the producer system 406A was shutting down and desired to inform its leasing agent that it would no longer be able to produce for consumer systems, the TTL and the requested durability TTL may be changed to a longer value. This high TTL value can increase the reliability of the data exchange (via more retransmissions) so that the leasing agent 402A has a high likelihood of receiving the shut down information. Additionally, a longer TTL may be sent by the producer system 406A to its leasing agent 402A in the request durability TTL field to indicate a longer requested TTL for retransmission of acknowledgment packets by the leasing agent 402A and/or describe the importance of the packet.

Similarly, other wide-scale distributed systems could also be implemented using the remote messaging protocol described herein. For example, an online chat system may use the remote messaging protocol to minimize or otherwise reduce open sustained connections between chat peers. Instead, each individual chat message/line may constitute a one packet exchange of data between network peers. This may be especially useful with low traffic chat services or non-real time chat services, or information distribution services, such as twitter, where no active connection is needed.

In some embodiments, multiple processes or threads may be using the remote messaging protocol on the same network node. Multiplexing of the protocol may be performed by assigning different processes or threads to different ports, or, alternatively, having multiple threads for a single application use the same port to receive messages. In some embodiments, the multiple threads of a process may access and process messages using the same port.

Similarly, in some embodiments, a process may divert an incoming connection to a second port or a range of ports. This may be advantageous in order to reduce the bottleneck on a single UDP port, or to get around firewall systems. For example, a client may contact a server using the remote messaging protocol and transmit a message that queries for a UDP port allocation. The server may respond, using the protocol, with a single ACK packet that has a port number (or range) as its payload. This port number could be assigned for use by the client sequentially, randomly, or by using any method the server chooses to use. The client may then transmit the FIN packet to the server to finish the transaction. After the client has received the allocated port number, the client may use the remote messaging protocol to access the desired network service, such as the online game server or load balancing leasing system described above.

TERMINOLOGY

A number of computing systems have been described throughout this disclosure. The descriptions of these systems are not intended to limit the teachings or applicability of this disclosure. For example, the computing systems described herein can generally include any computing device(s), such as desktops, laptops, video game platforms, television set-top boxes, televisions (e.g., internet TVs), computerized appliances, servers, web servers, and wireless mobile devices (e.g. smart phones, PDAs, tablets, or the like), to name a few. Further, it is possible for the computing systems described herein to be different types of devices, to include different applications, or to otherwise be configured differently. In addition, the computing systems described herein can include any type of operating system ("OS"). For example, the mobile computing systems described herein can implement an Android™ OS, a Windows® OS, a Mac® OS, a Linux or Unix-based OS, or the like.

Further, the processing of the various components of the illustrated systems can be distributed across multiple machines, networks, and other computing resources. In addition, two or more components of a system can be combined into fewer components. For example, the various systems illustrated as part of example leasing agent 402 can be distributed across multiple computing systems, or combined into a single computing system. Further, various components of the illustrated systems can be implemented in one or more virtual machines, rather than in dedicated computer hardware systems. Likewise, any data repositories shown can represent physical and/or logical data storage, including, for example, storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Depending on the embodiment, certain acts, events, or functions of any of the algorithms, methods, or processes described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially.

Each of the various illustrated systems may be implemented as a computing system (or multiple computing systems) that are programmed or configured to perform the various functions described herein. The computing system may include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium. The various functions disclosed herein may be embodied in such program instructions, although some or all of the disclosed functions may alternatively be implemented in application-specific circuitry (e.g., ASICs or FPGAs) of the computer system. Where the computing system includes multiple computing devices, these devices may, but need not, be co-located. The results of the disclosed methods and tasks may be persistently stored by transforming physical storage devices, such as solid state memory chips and/or magnetic disks, into a different state. Each process described may be implemented by one or more computing devices, such as one or more physical servers programmed with associated server code.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a" and "an" are to be construed to mean "one or more" or "at least one" unless specified otherwise.

Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present.

While the above detailed description has shown, described, and pointed out novel features as applied to various embodiments, it will be understood that various omissions, substitutions, and changes in the form and details of the devices or algorithms illustrated can be made without departing from the spirit of the disclosure. Thus, nothing in the foregoing description is intended to imply that any particular feature, characteristic, step, module, or block is necessary or indispensable. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A system for reliably receiving and responding to instructions for remote processing, the system comprising:

a computing system comprising one or more processors, the computing system further comprising a request communication module configured to:
    receive a remote procedure call request over a network from a client computing system, the remote procedure call request comprising a header and a first single non-transmission control protocol (TCP) datagram transmitted according to a non-transmission control protocol implemented at a transport layer,
    the header comprising a unique identifier associated with the remote procedure call request, wherein the unique identifier identifies a specific packet sequence between the computing system and the client computing system, and wherein the computing system multiplexes the remote procedure call request and other remote procedure call requests received from different client computing systems based on the unique identifier and unique identifiers of the other remote procedure call requests,
    the first single non-TCP datagram comprising:
        a requested remote procedure call,
        a packet type identifier that indicates that the first single non-TCP datagram is an initial packet associated with the unique identifier, and
        a message authentication code indicating authenticity of at least a portion of the first single non-TCP datagram;
    queue the requested remote procedure call to be executed;
    execute the requested remote procedure call;
    in response to executing the requested remote procedure call, transmit over the network to the client computing system a response to the remote procedure call request comprising a second single non-TCP datagram, the second single non-TCP datagram comprising the unique identifier associated with the remote procedure call request and a payload associated with output from the execution of the requested remote procedure call; and
    receive a third single non-TCP datagram from the client computing system in response to transmitting the response to the remote procedure call request, wherein the third single non-TCP datagram acknowledges receipt of the response to the remote procedure call request, and wherein the third single non-TCP datagram comprises the unique identifier associated with the remote procedure call request and indicates that a connection between the client computing system and the computing system can be closed without a separate packet sequence.

2. The system of claim 1, wherein the request communication module is further configured to retransmit the response to the remote procedure call request unless the computing system receives an acknowledgement to the response, the acknowledgement comprising the second single non-TCP datagram comprising the unique identifier associated with the remote procedure call request.

3. The system of claim 1, wherein the remote procedure call request comprises a lease assignment request.

4. The system of claim 1, wherein the request communication module is configured to retransmit the response in response to expiration of a timer value.

5. The system of claim 1, wherein the request communication module is further configured to transmit a single packet indicating that the remote procedure call request will not be processed if a remote procedure call request queue is full.

6. The system of claim 1, wherein the message authentication code is calculated over at least the unique identifier and a time value.

7. The system of claim 1, wherein the first single non-TCP datagram and the second single non-TCP datagram's transmission size is no larger than the smallest maximum transmission unit of all network links traversed by packets destined for the client computing system.

8. A method of reliably communicating with a second node by a first node over a network, the method comprising:
    by a computing system comprising one or more processors:
        transmitting a first data packet from a first node to a second node over the network, the first data packet transmitted according to a non-transmission control protocol implemented at a transport layer, the first data packet comprising a first header and a first payload, the first header comprising at least first data indicating that the first data packet is an initial data packet in a data packet session and second data indicating a unique identifier that identifies the data packet session, the second node multiplexing the first data packet and other data packets transmitted by other nodes to the second node based on the unique identifier and unique identifiers of the other data packets, the payload comprising first application-specific data;
        receiving from the second node over the network a second data packet, the second data packet comprising a second header and a second payload, the second header comprising at least third data indicating that the first data packet was received by the second node and the second data indicating the unique identifier that identifies the data packet session, the second payload comprising second application-specific data associated with output from an execution of the first application-specific data; and
        transmitting a third data packet to the second node over the network, the third data packet comprising fourth data indicating that the second data packet was received by the first node, fifth data indicating that the second node may release resources associated with retransmission of the second data packet and that a connection between the computing system and the second node can be closed without a separate packet sequence, and the second data indicating the unique identifier that identifies the data packet session.

9. The method of claim 8, wherein the first header further comprises a time indicator comprising the time the first packet was transmitted.

10. The method of claim 8, wherein the first header further comprises a payload offset value.

11. The method of claim 8, wherein the first data packet further comprises a user datagram protocol (UDP) header.

12. The method of claim 8, wherein the first application-specific data comprises a user datagram protocol (UDP) port allocation.

13. The method of claim 8, wherein the first application-specific data comprises a remote procedure call request, and wherein the second application-specific data comprises a remote procedure call response.

14. The method of claim 8, further comprising, after transmitting the first data packet, setting a retransmission timer; and, in response to expiration of the retransmission timer, retransmitting the first data packet.

15. The method of claim 14, further comprising, setting a time-to-live value that, once expired, ceases retransmission of the first data packet.

16. Non-transitory computer-readable storage having stored thereon instructions that, when executed, direct a first computing system, comprising one or more processors, to perform operations comprising:

in response to receiving, at a first computing system, a first single non-transmission control protocol (TCP) packet over a network from a second computing system, the first stele non-TCP packet transmitted according to a non-transmission control protocol implemented at a transport layer, the first single non-TCP packet comprising a first header and a first payload, the first header comprising a first message type identifier indicating an initial packet in a packet sequence and a unique identifier identifying the packet sequence, the first computing system multiplexing the first stele non-TCP packet and other non-TCP packets received from different computing systems based on the unique identifier and unique identifiers of the other non-TCP packets, the first payload comprising first application-specific information for consumption by the second computing system, causing a second single non-TCP packet to be transmitted over the network to the second computing system, the second single non-TCP packet comprising a second header and a second payload, the second header comprising a second message type identifier indicating a response packet in the packet sequence and the unique identifier identifying the packet sequence, the second payload comprising second application-specific data associated with output from an execution of the first application-specific information, determining whether a third single non-TCP packet has been received over the network from the second computing system, the third single non-TCP packet comprising a third header, the third header comprising a message type identifier indicating a final packet in the packet sequence, the unique identifier identifying the packet sequence, and an indication that a connection between the first computing system and the second computing system can be closed without a separate packet sequence, and in response to determining that the third single non-TCP packet has not been received after a specified first time period, causing the second single non-TCP packet to be retransmitted over the network to the second computing system if a second configured time period has not elapsed since transmission of the second single non-TCP packet.

17. The non-transitory computer-readable storage of claim 16, wherein the first single non-TCP packet further comprises a payload offset value.

18. The non-transitory computer-readable storage of claim 16, wherein the first single non-TCP packet further comprises a UDP header.

19. The non-transitory computer-readable storage of claim 16, wherein the first header further comprises a message authentication code indicating authenticity of one or more portions of the first single non-TCP packet.

20. The non-transitory computer-readable storage of claim 16, wherein the first application-specific information comprises a remote procedure call request, and the second application-specific information comprises a remote procedure call response.

21. The non-transitory computer-readable storage of claim 16, wherein the first single non-TCP packet and the second single non-TCP packet comprise gaming application data.

22. The non-transitory computer-readable storage of claim 16, wherein the first single non-TCP packet and the second single non-TCP packet comprise chat data.

23. The non-transitory computer-readable storage of claim 16, wherein the first application-specific information and the second application-specific information comprise computing resource leasing information.

24. The non-transitory computer-readable storage of claim 16, wherein the first computing system comprises a first leasing agent, and the first payload further comprises updated status information for the second computing system, wherein the second computing system is configured as a producer system.

* * * * *